United States Patent
Giesler et al.

(10) Patent No.: US 9,491,417 B2
(45) Date of Patent: Nov. 8, 2016

(54) METHOD FOR PROVIDING A REPRESENTATION IN A MOTOR VEHICLE DEPENDING ON A VIEWING DIRECTION OF A VEHICLE OPERATOR

(75) Inventors: Björn Giesler, Ingolstadt (DE); Thorsten Kölzow, Ingolstadt (DE); Bernd Jakobs, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 793 days.

(21) Appl. No.: 13/605,159

(22) Filed: Sep. 6, 2012

(65) Prior Publication Data

US 2013/0235200 A1 Sep. 12, 2013

(30) Foreign Application Priority Data

Sep. 7, 2011 (DE) .................. 10 2011 112 717

(51) Int. Cl.
| | |
|---|---|
| H04N 7/18 | (2006.01) |
| G02B 27/01 | (2006.01) |
| B60R 1/00 | (2006.01) |
| B60K 35/00 | (2006.01) |

(52) U.S. Cl.
CPC .............. H04N 7/185 (2013.01); B60K 35/00 (2013.01); B60R 1/00 (2013.01); G02B 27/01 (2013.01); *B60R 2300/205* (2013.01); *B60R 2300/308* (2013.01); *G02B 2027/0112* (2013.01); *G02B 2027/0187* (2013.01)

(58) Field of Classification Search
CPC ........ H04N 7/18; H04N 7/181; H04N 7/183; H04N 7/188; H04N 5/2252
USPC ............................................. 348/148, 77, 78
IPC ........................................................ H04N 7/18
See application file for complete search history.

(56) References Cited

U.S. PATENT DOCUMENTS 8,779,909 B1 * 7/2014 Richardson ................ 340/425.5
2008/0079753 A1 4/2008 Victor

FOREIGN PATENT DOCUMENTS

| CN | 1886639 A | 12/2006 |
|---|---|---|
| DE | 10 2005 020 772 A1 | 11/2006 |
| DE | 10 2005 052 424 A1 | 5/2007 |
| DE | 10 2005 058 018 A1 | 6/2007 |
| DE | 10 2007 025 531 A1 | 12/2008 |
| DE | 10 2009 003 220 A1 | 11/2010 |
| WO | WO 2005/054786 A1 | 5/2005 |

* cited by examiner

*Primary Examiner* — Trang U Tran
(74) *Attorney, Agent, or Firm* — Henry M. Feiereisen LLC

(57) ABSTRACT

The physiological characteristics of the eye are particularly well taken into account in a motor vehicle by selecting a representation at a representation site from at least two types of representations depending on whether the respective representation site is located in a central field of view of the vehicle operator or is located in a peripheral field of view of the vehicle operator. Preferably, intensive colors and strong color contrasts are selected in the central field of view of the vehicle operator, whereas representations that change over time are selected in the peripheral field of view.

2 Claims, 1 Drawing Sheet

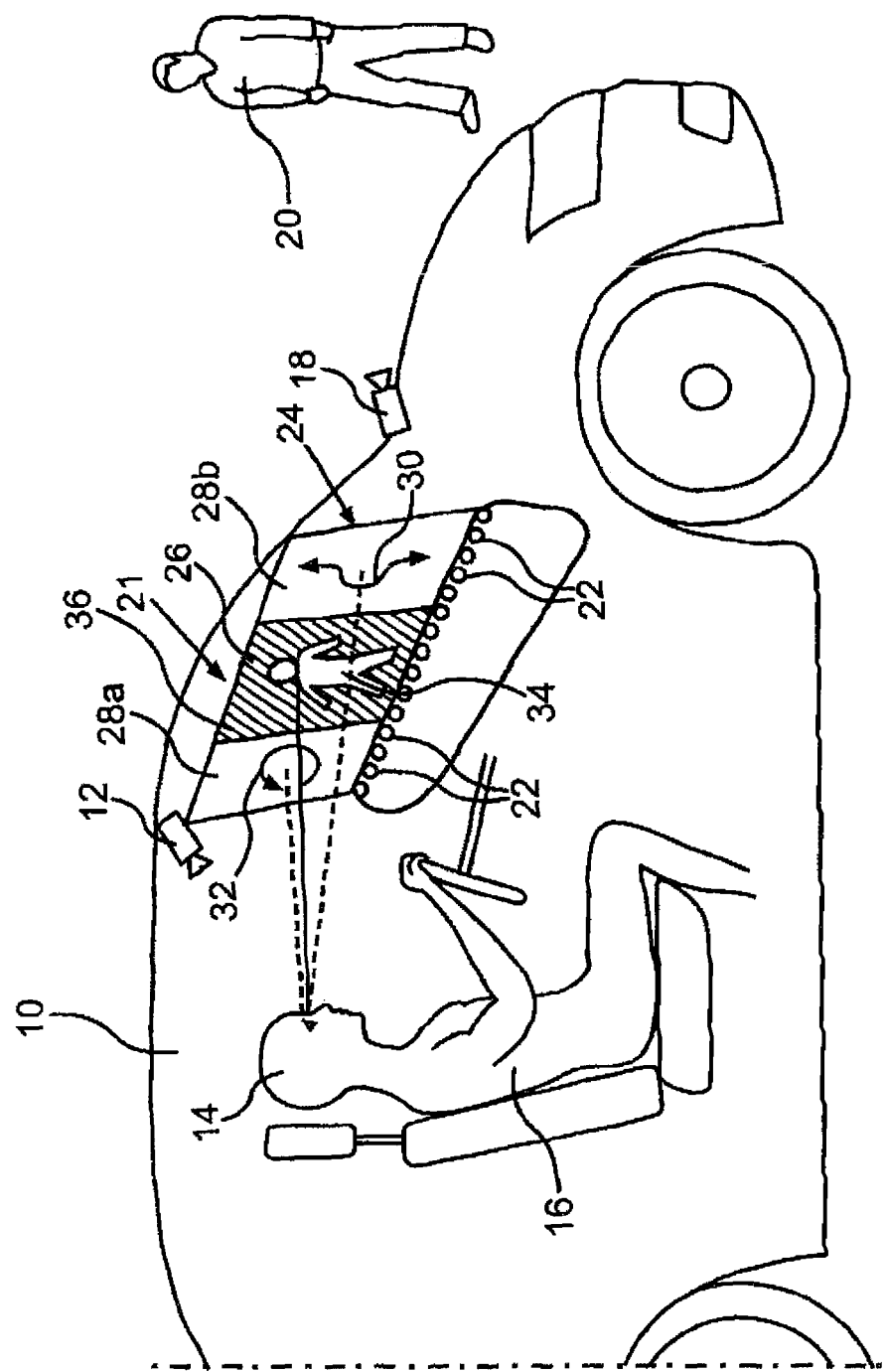

METHOD FOR PROVIDING A REPRESENTATION IN A MOTOR VEHICLE DEPENDING ON A VIEWING DIRECTION OF A VEHICLE OPERATOR

CROSS-REFERENCES TO RELATED APPLICATIONS

This application claims the priority of German Patent Application, Serial No. 10 2011 112 717.1, filed Sep. 7, 2011, pursuant to 35 U.S.C. 119(a)-(d), the content of which is incorporated herein by reference in its entirety as if fully set forth herein.

BACKGROUND OF THE INVENTION

The present invention relates to a method for providing a representation in a motor vehicle at at least one representation site.

The following discussion of related art is provided to assist the reader in understanding the advantages of the invention, and is not to be construed as an admission that this related art is prior art to this invention.

A representation site may be embodied as a display device provided specifically for the representation, for example a display screen or display, or a number of light emitting diodes; however, the representation site may also be a projection surface, with the windshield being particularly suited for a so-called head-up display.

Head-up display located in the field of view of the observer are known in the art. In addition, display systems are known where the representation depends on whether the observer looks onto the display system or looks completely away from the display system.

However, a persistent problem is to better and particularly quickly alert the vehicle operator to certain objects.

It would therefore be desirable and advantageous to obviate prior art shortcomings and to provide an improved approach for providing a representation which allows alerting the vehicle operator to objects in the path of the motor vehicle more quickly.

SUMMARY OF THE INVENTION

According to one aspect of the present invention, a method for providing a representation in a motor vehicle at a representation site includes the steps of capturing a viewing direction of a vehicle operator, and selecting, depending on the viewing direction, a representation from at least two types of representations, with the type of the selected representation depending on whether the at least one representation site is located in a central field of view of the vehicle operator or is located in a peripheral field of view of the vehicle operator.

According to another aspect of the present invention, a motor vehicle includes a first device capturing a viewing direction of a vehicle operator, and a second device providing a representation in the motor vehicle at a representation site. The second device selects the representation from two types of representations, depending on whether the representation site is located in a central field of view of the vehicle operator (which can be derived from the captured viewing direction) or is located in a peripheral field of view of the vehicle operator (which can also be derived from the captured viewing direction).

With the invention, the representation can be adapted to the physiological characteristics of the human eye: the observer is particularly susceptive to certain colors in the central field of view, which are therefore preferably used on a larger scale when the representation site is located in the central field of view than when the representation is located in the peripheral field of view. In the peripheral field of view, the observer is more adept to notice movements, so that a representation that changes with time, for example with an intensity that varies over a period of a time, optionally in form of a wave extending over the display surface, is preferably provided in the peripheral field of view of the vehicle operator; time-variable representations include, for example, jitter of a projected image, expansion and thereafter contraction of a projected image, and the like.

The selected types of representations can thus provide excellent support for the vehicle operator, wherein the operator notices as much as possible of the representation and the object of the representation is particularly well attained.

The method according to the invention may be used in different contexts. According to an advantageous feature of the present invention, the viewing direction of the vehicle operator itself may determine the representation site of at least one representation. In other words, the representation moves with the field of view of the vehicle operator, whereby the regions of the representation or partial representations located in the central field of view of the vehicle operator are displayed differently than the regions of the representation or partial representations located in the peripheral field of view.

According to another advantageous feature of the present invention, the at least one representation site in the motor vehicle may also be fixed in space. The type of representation at a representation site may then change, depending if the vehicle operator is looking at that moment at the representation site in the central field of view or in the peripheral field of view. For example, a screen display may operate with bold color contrasts as long as the vehicle operator has the display in the central field of view, and may transition to a representation that varies over time when the representation enters the peripheral field of view, and vice versa.

According to another advantageous feature of the present invention, the representation site may be determined by an object captured by the capture device of the motor vehicle outside the motor vehicle, possibly also in cooperation with the viewing direction. For example, when a pedestrian crosses of the travel lane of the motor vehicle, the contour of the pedestrian may be projected onto the windshield with a head-up display, with the contour overlapping with the pedestrian, meaning the real object, from the viewing direction of the vehicle operator. The contour may be indicated by a jittery movement, as long as it is located in the peripheral field of view of the vehicle operator, and may change to a jitter-free movement when the pedestrian moves into the central field of view of the vehicle operator. The latter may occur when the vehicle operator turns towards the pedestrian due to the jittery movement of the representation, or when the pedestrian continues to move on and thus walks into the central field of view of the vehicle operator; both these situations may, of course, also occur together.

According to an advantageous feature of the present invention, the motor vehicle according to the invention may include a device for providing a representation, for example a projector for providing a head-up display or a number of light emitting diodes. The motor vehicle may further include a device for capturing a viewing direction, for example a camera, directed towards the head of the vehicle operator and capable of capturing the viewing direction. If desired, the device capturing a viewing direction may also include a plurality of partial devices, for example several cameras. The device providing a representation selects the particular representation from a representation site of two representation sites, depending on whether the respective representation site is located in a central field of view of the vehicle operator or is located in a peripheral field of view of the vehicle operator. A suitably constructed control device may be arranged, for example by programming with suitable software, in the device providing a representation (i.e., the selection).

According to another advantageous feature of the present invention, a capture device for capturing an object may be arranged outside the motor vehicle, and a device providing a representation is designed to determine (by suitable programming of its control device) a respective representation site based on an object captured by the capture device.

BRIEF DESCRIPTION OF THE DRAWING

Other features and advantages of the present invention will be more readily apparent upon reading the following description of currently preferred exemplified embodiments of the invention with reference to the accompanying drawing, in which the sole:

FIG. 1 shows a motor vehicle in which the method according to the present invention is realized.

DETAILED DESCRIPTION OF PREFERRED EMBODIMENTS

These embodiment depicted in the FIGURE is to be understood as illustrative of the invention and not as limiting in any way. It should also be understood that the FIGURE is not necessarily to scale and that the embodiment is sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, there is shown in FIG. 1 a motor vehicle indicated with the general reference symbol 10. The motor vehicle 10 includes at least one camera 12 which is directed toward the head 14 of the motor vehicle operator 16 and hence capable of capturing the viewing direction of the motor vehicle operator 16. Another camera 18 captures the surroundings outside the motor vehicle, for example a pedestrian 20. A number of light emitting diodes 22 is provided in the motor vehicle which may be arranged, for example, in pairs of two light emitting diodes, wherein one light emitting diode emits red light and the other green light. In addition, a head-up display 21, i.e. a representation on the windshield 24 of the motor vehicle, may be provided in the motor vehicle 10.

In the present embodiment, the motor vehicle operator 16 is to be alerted to the presence of the pedestrian 20 by a representation. To this end, the viewing direction is continuously captured with the camera 12, to determine whether the pedestrian 20 is located in the central field of view 26 of the vehicle operator 16 or in one of the two peripheral field of views (lateral field of views) 28a and 28b adjacent to the central field of view 26. As long as the pedestrian 20 is located, for example, in the peripheral field of view, the light emitting diodes 22 associated with the peripheral field of view 28b may be illuminated, or a contour of the pedestrian 20 can be amplified with a wavy pattern, as indicated by the arrow 30. The same applies for the peripheral field of view 28a; however, for example a circular motion 32 or a helical motion of pixels on the windshield 24 may also be employed.

When the pedestrian 20 enters the central field of view 26, a contour 34 of the pedestrian is accentuated in color, for example in red, whereas the region 36 outside contour is indicated in a contrasting color, for example green. The representation is displayed such that the vehicle operator 16 is still able to actually see the pedestrian 20 through the windshield 24. The light emitting diodes 22 in the region associated with the central region 26 may be continuously illuminated green and red colors.

By designing a representation in the peripheral field of view 28a, 28b of a vehicle operator 16 to be different from a representation for the central field of view 26, consideration can be given to the physiological characteristics of the human eye: the eye is particularly well adapted to identify movements in the peripheral field of views 28a, 28b, and intensive colors and particularly strong color contrasts in the central field of view.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for providing a representation in a motor vehicle at least one representation site, comprising the steps of:
    determining the at least one representation site based on an object located outside the motor vehicle and captured by a capture device,
    capturing a viewing direction of a vehicle operator, and
    selecting, depending on the viewing direction, a representation from at least two types of representations, wherein the selected representation is represented by using color contrasts when the at least one-representation site is located in a central field of view of the vehicle operator and the selected representation is represented by a temporal variation comprising jitter or expansion and thereafter contraction of a projected image of the selected representation when the at least one-representation site is located in a peripheral field of view of the vehicle operator.

2. A motor vehicle comprising
    a first device capturing a viewing direction of a vehicle operator, and
    a second device providing a representation in the motor vehicle at a representation site, and
    a third device for capturing an object located outside the motor vehicle, wherein the second device determines the representation site based on the captured object,
    wherein the second device is configured to select, depending on the viewing direction, a representation from two types of representations, wherein the selected representation is represented by using color contrasts when the representation site-is located in a central field of view of the vehicle operator and the selected representation is represented by a temporal variation comprising jitter or expansion and thereafter contraction of a projected image of the selected representation when the representation when the representation site-is located in a peripheral field of view of the vehicle operator.

* * * * *